United States Patent
Pressley et al.

(10) Patent No.: US 12,103,221 B2
(45) Date of Patent: Oct. 1, 2024

(54) BRIM-FORMING MACHINE AND METHOD OF USE

(71) Applicant: Berry Global, Inc., Evansville, IN (US)

(72) Inventors: Robert L. Pressley, Evansville, IN (US); Jeffrey A. Mann, Evansville, IN (US); Leif D. Gabrielson, Lawrence, KS (US); Zachariah N. Fellers, Lawrence, KS (US)

(73) Assignee: Berry Global, Inc., Evansville, IN (US)

( * ) Notice: Subject to any disclaimer, the term of this patent is extended or adjusted under 35 U.S.C. 154(b) by 0 days.

(21) Appl. No.: 18/200,194

(22) Filed: May 22, 2023

(65) Prior Publication Data

US 2023/0286208 A1   Sep. 14, 2023

Related U.S. Application Data

(63) Continuation of application No. 16/887,740, filed on May 29, 2020, now Pat. No. 11,654,608.

(60) Provisional application No. 62/855,365, filed on May 31, 2019.

(51) Int. Cl.
*B29C 57/12* (2006.01)
*B29B 13/02* (2006.01)
*B29L 31/00* (2006.01)
*B65D 1/26* (2006.01)

(52) U.S. Cl.
CPC ............ *B29C 57/12* (2013.01); *B29B 13/025* (2013.01); *B65D 1/265* (2013.01); *B29L 2031/7132* (2013.01)

(58) Field of Classification Search
CPC ....... B29C 57/12; B29C 57/125; B65D 1/265; B29L 2031/7132
See application file for complete search history.

(56) References Cited

U.S. PATENT DOCUMENTS

| | | | |
|---|---|---|---|
| 2,778,287 A | 1/1957 | Moore | |
| 3,232,453 A | 2/1966 | Rukavina | |
| 3,339,005 A | 8/1967 | Brown | |
| 3,579,737 A | 5/1971 | Gerber | |
| 3,633,469 A | 1/1972 | Kinney | |
| 4,391,768 A * | 7/1983 | Arends | B29C 57/125 264/296 |
| 4,433,968 A | 2/1984 | Koll | |
| 6,093,010 A | 7/2000 | Lamson | |
| 6,120,426 A | 9/2000 | Bacon | |
| 6,737,003 B1 * | 5/2004 | Golden | B29C 57/125 264/40.6 |
| 7,175,409 B1 | 2/2007 | Golden | |
| 2005/0013894 A1 * | 1/2005 | Phillips | B29C 57/125 425/391 |
| 2005/0186893 A1 | 8/2005 | Hulin | |

(Continued)

OTHER PUBLICATIONS

International (PCT) Search Report and Written Opinion for PCT/US2020/35241 dated Aug. 31, 2020, BP-545 PCT II, 12 pages.

(Continued)

*Primary Examiner* — Emmanuel S Luk
*Assistant Examiner* — Elisa H Vera
(74) *Attorney, Agent, or Firm* — Barnes & Thornburg LLP

(57) ABSTRACT

A drink cup includes a body formed to include an interior fluid-storage region and a brim. The brim is coupled to the body to surround an opening into the interior fluid-storage region. The brim is formed by a brim-forming machine.

19 Claims, 9 Drawing Sheets

(56) References Cited

U.S. PATENT DOCUMENTS

2018/0111346 A1 4/2018 Sand
2018/0133782 A1 5/2018 Meador

OTHER PUBLICATIONS

Office Action (Final Rejection) dated Oct. 17, 2022 for U.S. Appl. No. 16/887,740 (pp. 1-12).

* cited by examiner

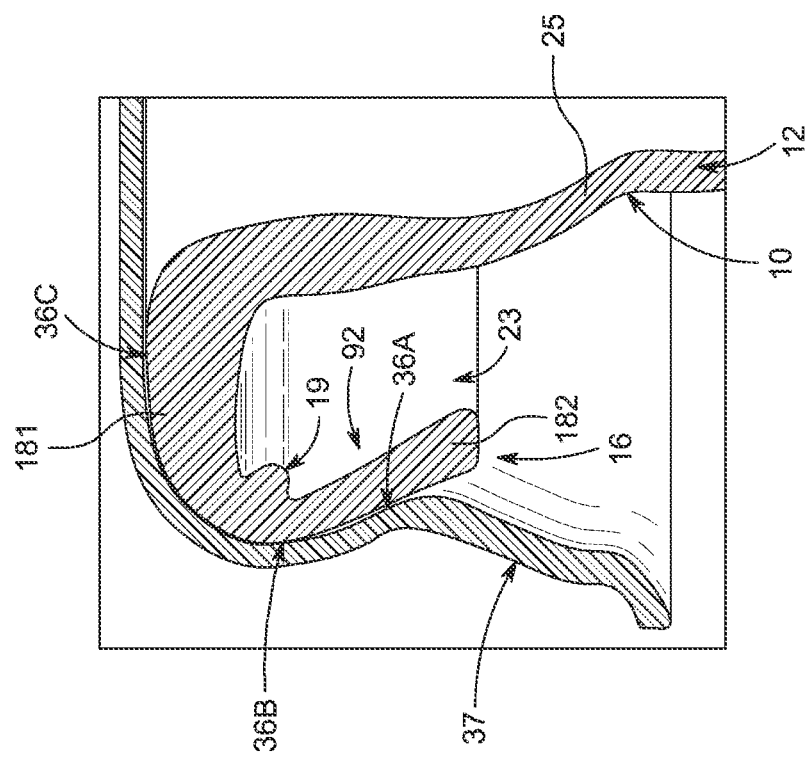
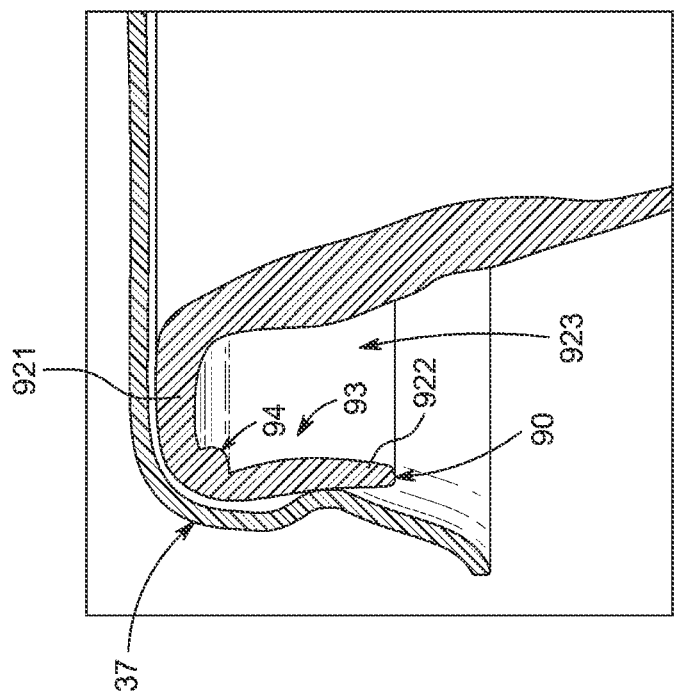
FIG. 4
FIG. 3

BRIM-FORMING MACHINE AND METHOD OF USE

PRIORITY CLAIM

This application is a continuation of U.S. application Ser. No. 16/887,740, filed May 29, 2020, which claims priority under 35 U.S.C. § 119(e) to U.S. Provisional Application No. 62/855,365, filed May 31, 2019, each of which is expressly incorporated by reference herein.

BACKGROUND

The present disclosure relates to a container, and particularly to a container having a brim. More particularly, the present disclosure relates to a machine and process for establishing a formed brim on the container.

SUMMARY

According to the present disclosure, a brim-forming machine includes a plurality of brim former each configured to rotate about an associated former axis. The brim formers engage a container and deform a brim of the container to establish a container having a rolled brim suitable for mating with a lid.

In illustrative embodiments, the brim-forming machine further includes a hot-air manifold coupled to the plurality of brim formers and configured to provide hot air to the set of brim formers. The hot air heats a portion of each brim former and, in turn, heats the brim of the container.

In illustrative embodiments, the brim-forming machine further includes a cold-water supply coupled to the set of brim formers in longitudinal spaced-apart relation to the hot-air manifold and configured to supply cooling water to the set of brim formers. The cooling water cools a downstream portion of each brim former and, in turn, cools the brim of the container.

In illustrative embodiments, the brim-forming machine further includes an alignment system coupled to the plurality of brim formers and configured to change radial and circumferential positioning of each brim former in the set of brim formers.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a container-manufacturing process in accordance with the present disclosure showing that the process comprises the steps of extruding a sheet of plastics materials, heating the sheet, molding the sheet to form a molded sheet including a carrier sheet and a set of containers coupled to the carrier sheet, separating the set of containers from the carrier sheet, accumulating containers to produce a stack of nested containers, and forming a brim on each container using a brim-forming machine as shown in FIG. 2;

FIG. 3 is a partial sectional view of a comparative container made by another brim-forming machine and a lid coupled to the comparative container showing that lid has limited engagement with the formed brim minimizing sealing with the formed brim;

FIG. 4 is a partial sectional view of a container made using the brim-forming machine of the present disclosure and a lid coupled to the container showing that the lid has maximized engagement with the rolled brim, thereby maximizing sealing with the rolled brim;

Figure 2:
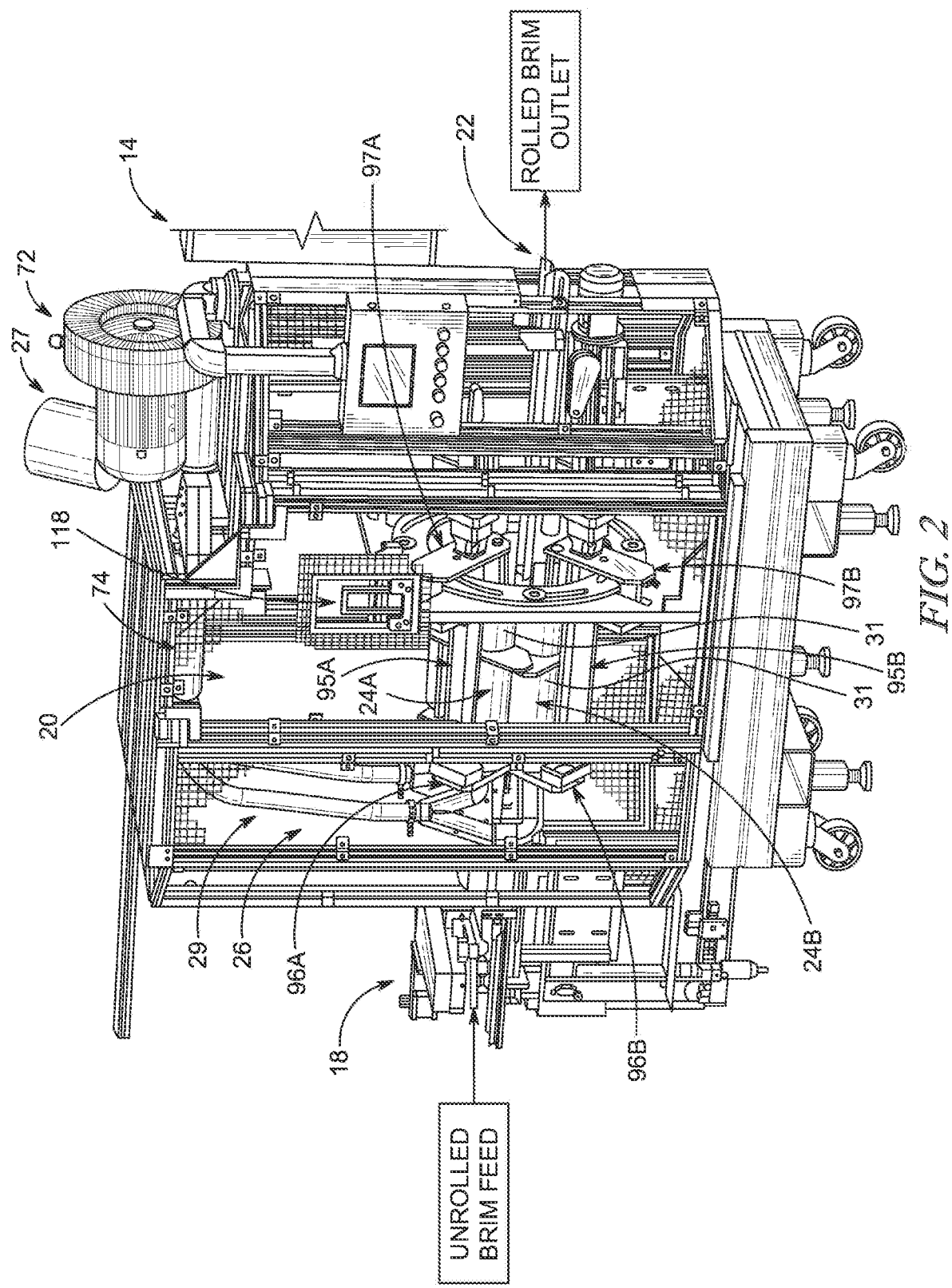
FIG. 2 is a perspective and diagrammatic view of a brim-forming machine in accordance with the present disclosure showing that a stack of containers having unrolled brims is fed to the machine, the machine interacts with each unrolled brim to form a rolled brim, and a stack of containers having rolled brims is output from the machine.
Figure 5:
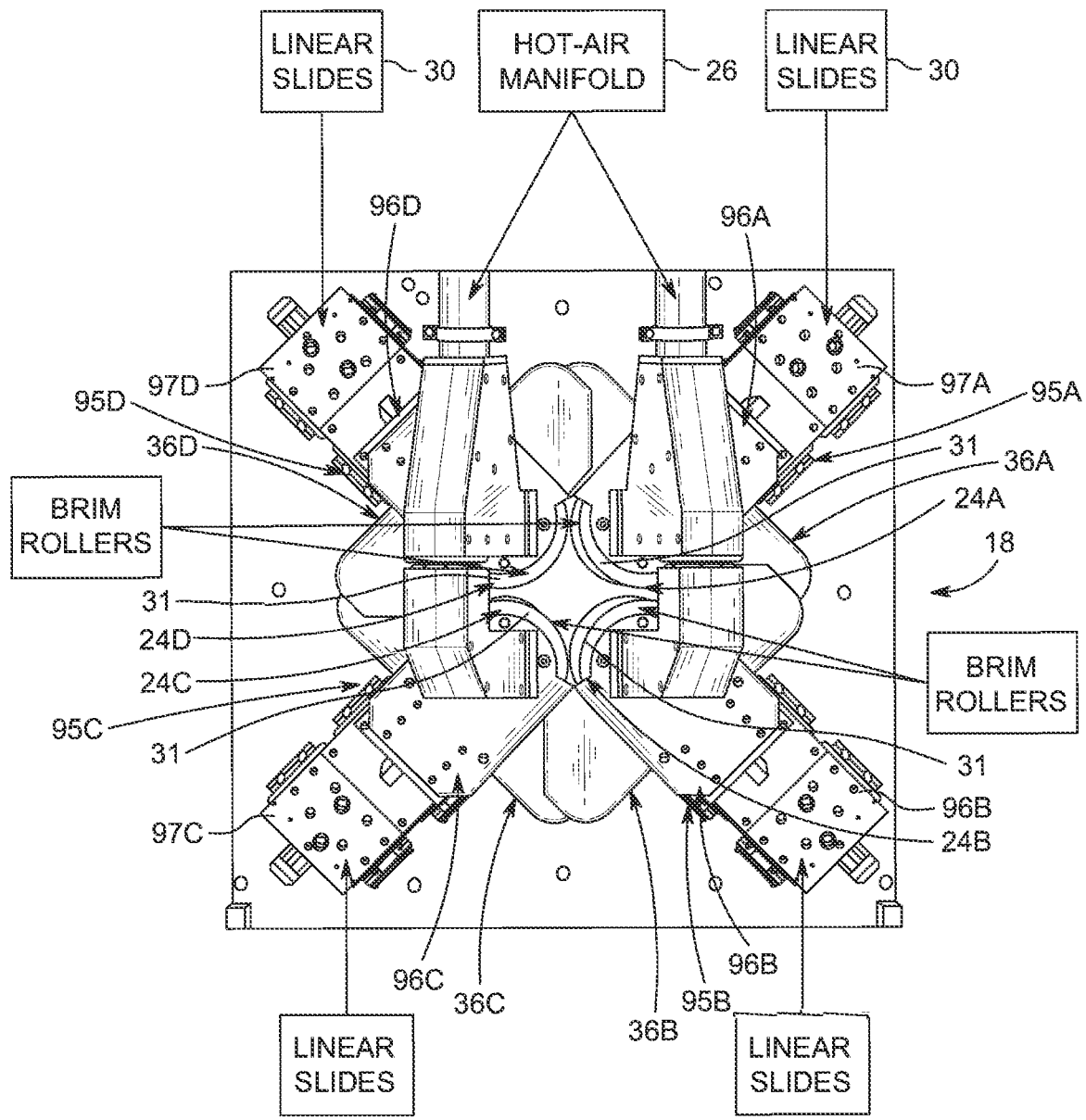
FIG. 5 is partial elevation view and diagrammatic view of the brim-forming machine of FIG. 2 taken from the perspective of a feed end of the brim-forming machine showing that the brim-forming machine includes four brim formers coupled to associated linear slides used to manage alignment of the brim formers and showing that hot air is provided to each brim former by a hot-air manifold.
Figure 6:
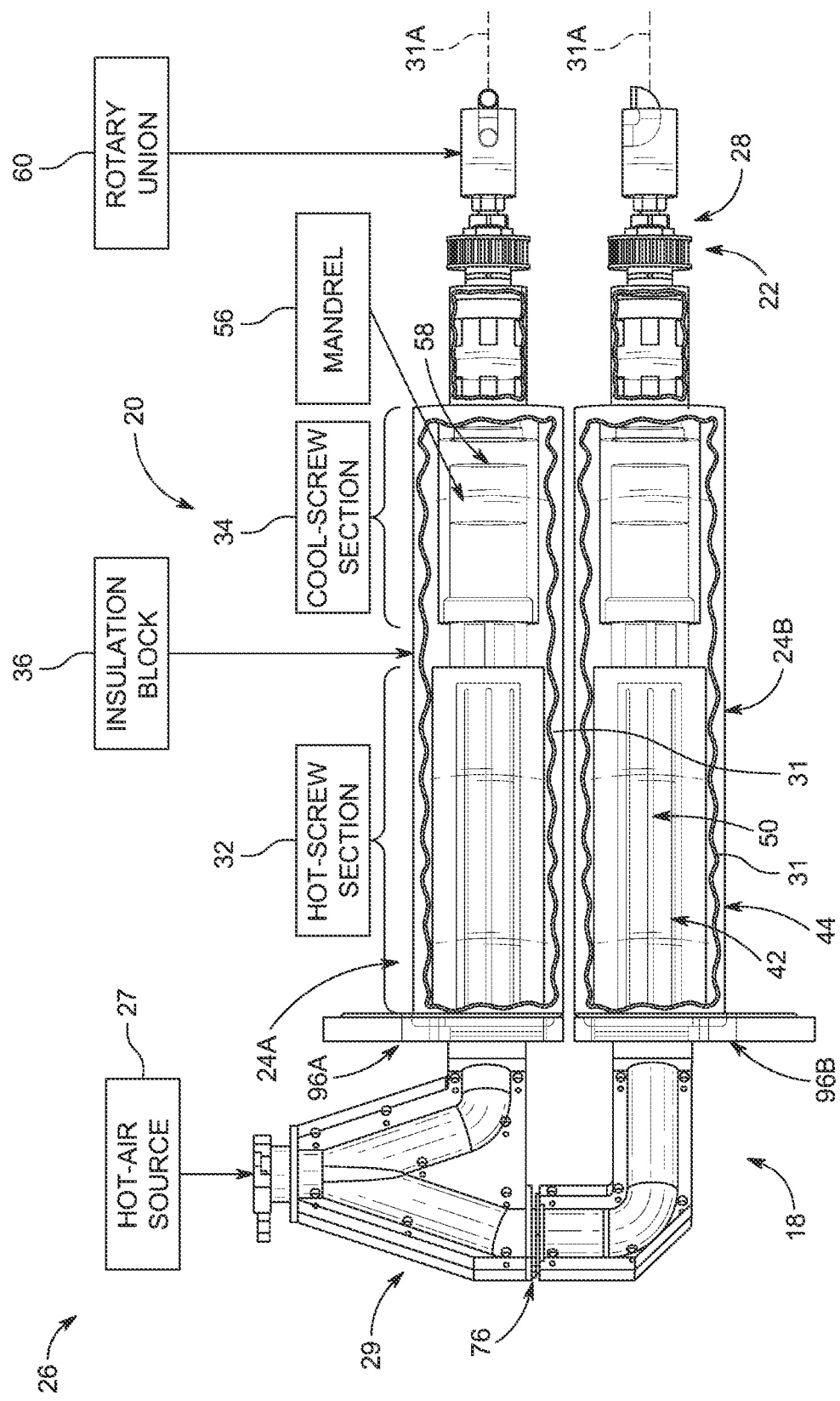
Figure 7:
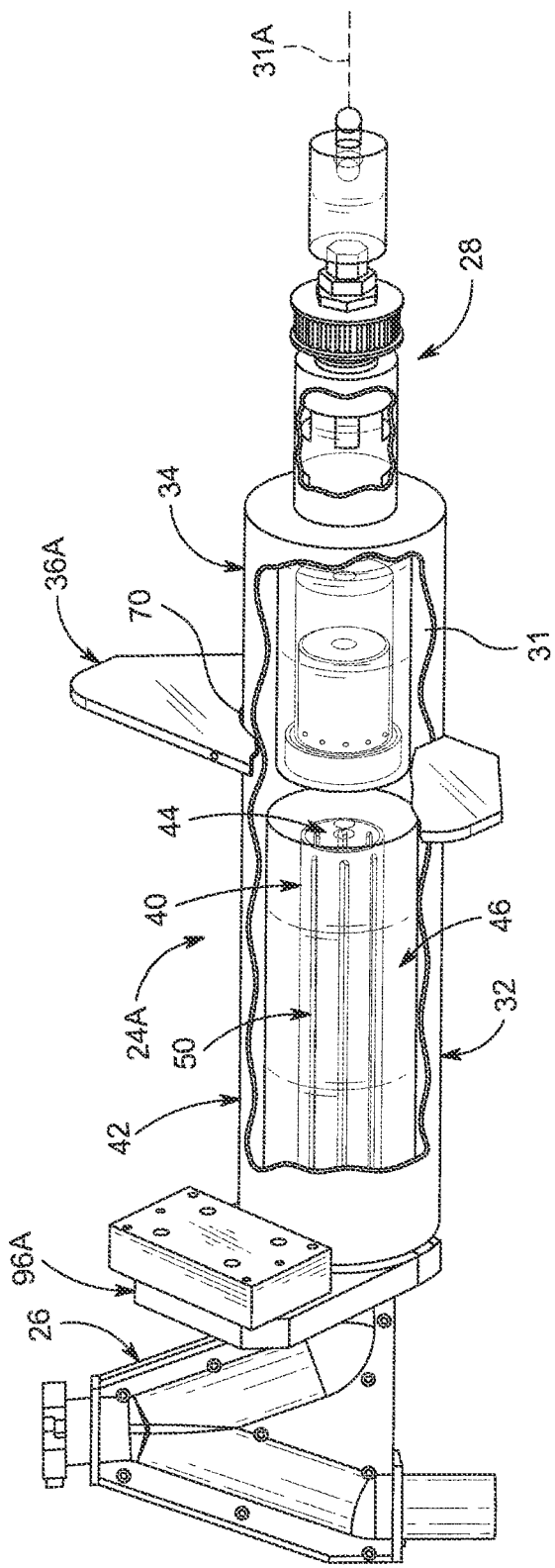
Figure 8:
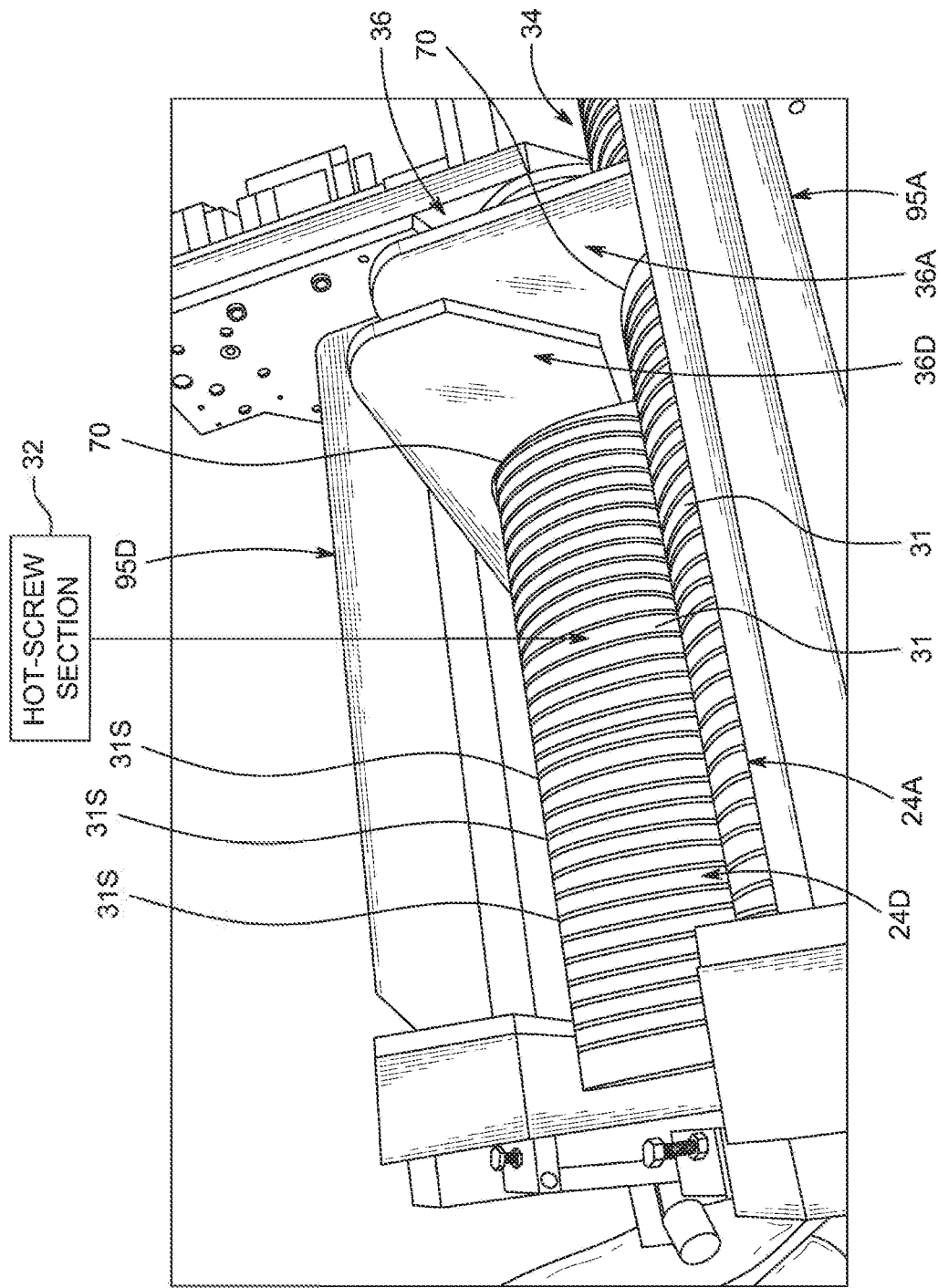
Figure 9:
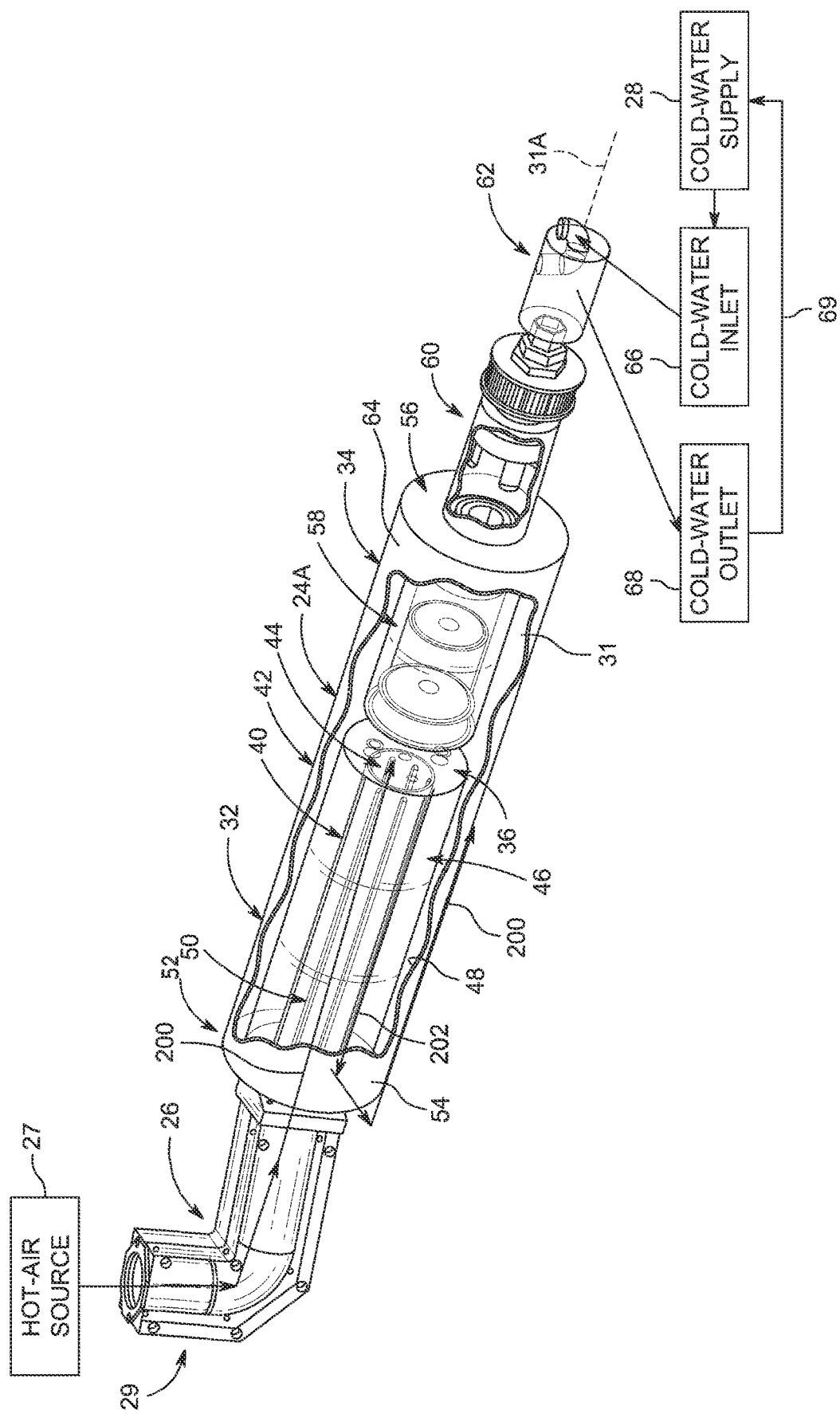
Figure 10:
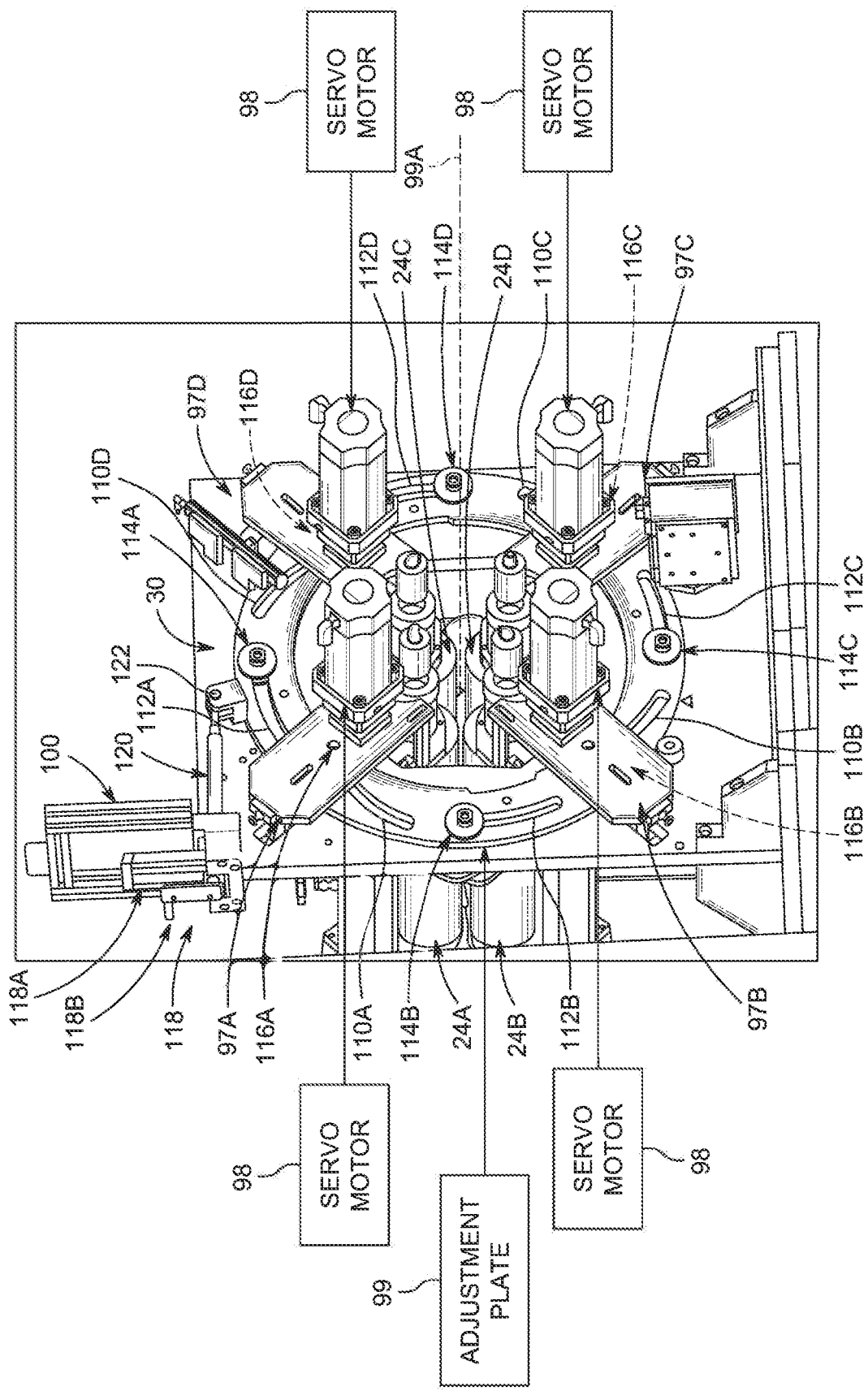

FIG. 6 is a partial elevation view and diagrammatic view of the brim-forming machine of FIGS. 2 and 5 taken from the perspective of a side of the brim-forming machine showing that each brim former includes a hot-screw section heated by hot air provided via the hot-air manifold, a cold-screw section cooled by cooled water downstream of the hot-screw section, and an insulation block located between the hot-screw section and the cold-screw section;

FIG. 7 is a partial perspective view of one of the upper brim formers;

FIG. 8 is a perspective view showing the hot-screw portion of the brim-forming machine in accordance with the present disclosure;

FIG. 9 is a view similar to FIG. 7 suggesting how hot air from the hot-air manifold is moved through the hot-screw section; and FIG. 10 is a partial elevation and diagrammatic view of the brim-forming machine of FIGS. 2, 5-7, and 9 taken from the perspective of an output end of the brim-forming machine showing that each brim former is driven by a separate servo motor and that the servo motors and brim formers are adjusted by an adjustment plate which coordinates radial and circumferential movement of the brim forms during alignment of the brim formers.

DETAILED DESCRIPTION

Figure 1:
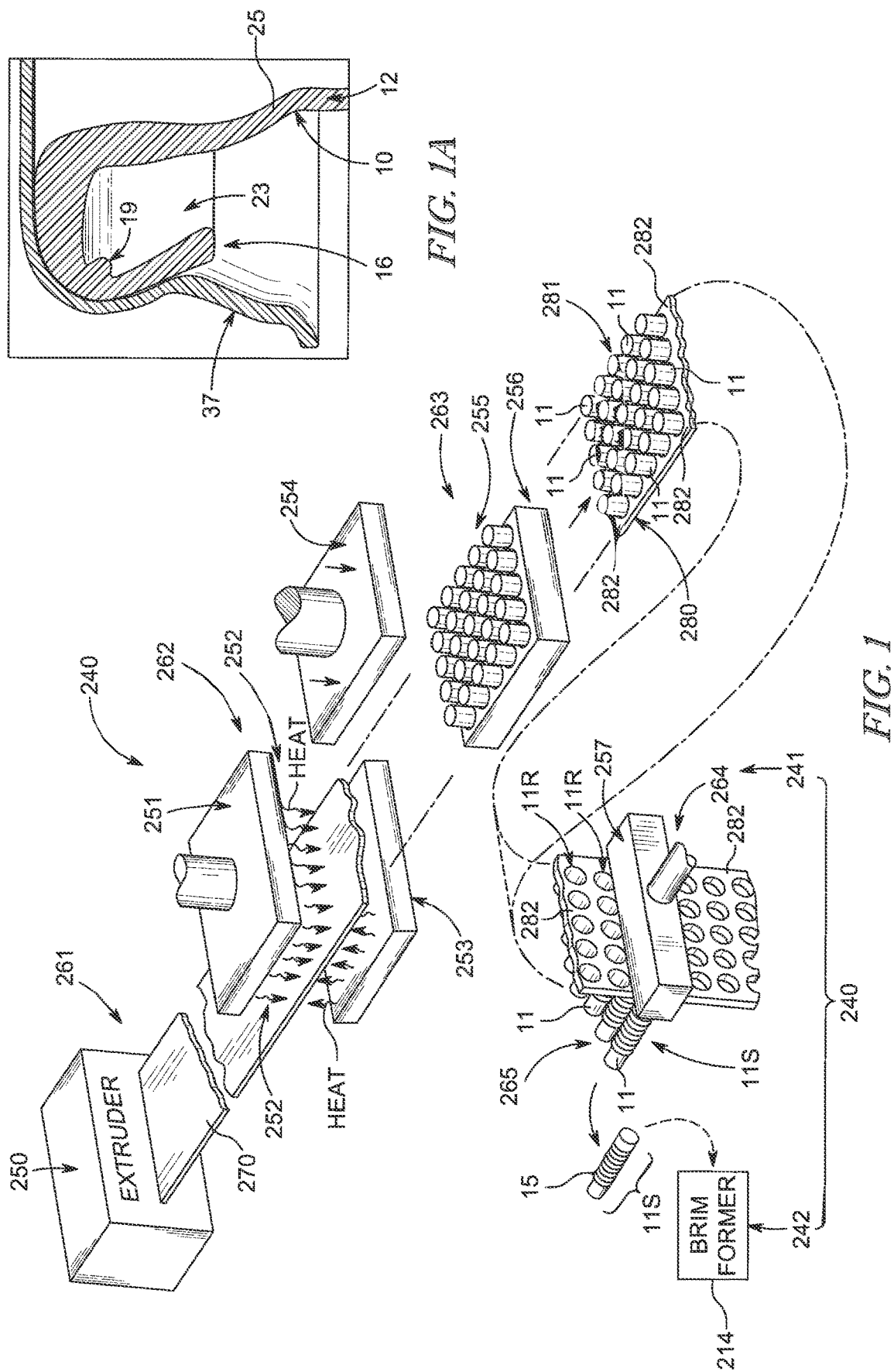
FIG. 1A is a partial sectional view of a drink cup made in accordance with the present disclosure showing that the drink cup includes a body and a rolled brim and suggesting that a lid is coupled to the rolled brim to minimize leaks from the drink cup when the lid is coupled to the rolled brim.

A drink cup 10 includes a body 12 and a rolled brim 16 as suggested in FIG. 1A. The drink cup 10 is produced by the container-manufacturing process 240 as suggested in FIG. 1. Container-manufacturing process 240 provides a stack of containers having unrolled brims. A brim-forming machine 14, as shown in FIG. 2, receives the stack of containers having unrolled brims and rolls each brim to provide a stack of containers having rolled brims as suggested in FIGS. 1A and 4.

The brim-forming machine 14 includes a feed section 18, a forming section 20, and an output section 22 as shown in FIG. 1. The feed section 18 provides the continuous stack of containers having unrolled brims to the forming section 20. The forming section 20 changes the unrolled brims into rolled brims through a combination of heat, force, and cooling as the containers move along the forming section 20. The output section 22 transports the continuous stack of containers having rolled brims from the forming section 20 to a later step such as printing, storage, and packing for shipment.

The forming section 20 includes a set of four brim formers 24A, 24B, 24C, 24D, a hot-air manifold 26 configured to provide hot air, a cold-water supply 28 configured to supply cooling water, and an alignment system 30 used to adjust or change radial and circumferential positioning of the brim formers 24A, 24B, 24C, 24D. Each brim former 24A, 24B, 24C, 24D includes a rotating spindle 31 and a servo motor 98 as suggested in FIG. 10. Each rotating spindle 31 is driven by an associated servo motor 98 for rotation about a corresponding former axis 31A. The rotation speed of each spindle 31 may be coordinated or set separately and independently of every other spindle 31.

Each rotating spindle 31 includes a hot-screw section 32, a cold-screw section 34, and an insulation block 36 as shown in FIG. 6 and suggested in FIG. 10. The hot-screw section 32 is located upstream of the cold-screw section 34. The insulation block 36 is located between the hot-screw section 32 and the cold-screw section 34 as shown in FIG. 6. The servo motors 98 are located downstream of the cold-screw section 34 and the insulation block 36.

An outer surface 54 of each spindle 31 is formed to include a helical slot 31S that extends circumferentially around the spindle 31 and is sized to receive the unrolled brim of a container as shown in FIG. 8. The shape of the helical slot 31S forms the unrolled brim of the container into a rolled brim by pressure and heat as the container advances along the hot-screw section 32. The shape of the helical slot 31S may vary as the slot 31S extends downstream such as by varying the thickness of the slot 31S to form the brim of the container to a desired shape.

The hot-screw section 32 is coupled to the feed section 18 and is provided hot air via the hot-air manifold 26 to heat the hot-screw section 32. The hot air allows heating of the hot-screw section 32 without the use of rotating parts and allows for heating ovens to be omitted. The hot-screw section 32 of each brim former 24A, 24B, 24C, 24D engages the unrolled brim of the containers moving through it to cause heat to be transferred to the unrolled brim softening the plastic material and allowing the material to be formed by force applied by the hot-screw section 32.

The hot-screw section 32 of the rotating spindle 31 includes an inner cylinder 40 and an outer cylinder 42 as shown in FIGS. 6, 7, and 9. The inner cylinder 40 is coupled to the hot-air manifold 26 and defines a first hot-air passageway 44. The outer cylinder 42 is spaced radially from the inner cylinder 40 and is concentric with the inner cylinder 40 relative to the former axis. A second hot-air passageway 46 is arranged radially between the inner cylinder 40 and the outer cylinder 42.

The hot-air manifold 26 includes a hot-air source 27 and a plurality of hot-air ducts 29 that direct the hot air to each brim former 24A, 24B, 24C, 24D as shown in FIGS. 6 and 9. The hot-air source 27 includes a blower 72 and at least one hot-air heater 74 downstream of the blower 72. The heater 74 is configured to heat air from the blower 72 to temperatures of up to 1200 degrees Fahrenheit (F). Hot air from the hot-air source 27 is divided amongst the plurality of hot-air ducts 29 so that an individual hot air duct 29 delivers hot air to a corresponding brim former 24A, 24B, 24C, 24D. Each hot air duct 29 has a slip joint 76 to allow for radial movement of the brim formers 24A, 24B, 24C, 24D toward and away from one another. In the illustrative embodiment, two hot-air heaters 74 are included in the brim-forming machine 14, although any number of heaters may be used in other embodiments.

Hot air is injected into the first hot-air passageway 44 from the hot-air manifold 26 in a first direction 200 as suggested in FIG. 9. The hot air may exit the first hot-air passageway 44 and enter the second hot-air passageway 46 where it travels in an opposite second direction 202 to heat an inside surface 48 of the outer cylinder 42. The inner cylinder 40 may be formed to include a plurality of longitudinal slots 50 that extend through the inner cylinder 40 and run parallel with the former axis 31A. Some of the hot air may flow from the first hot-air passageway 44 to the second hot air-passageway 46 through the slots 50. The hot air exits the second hot-air passageway at an inlet end 52 of the spindle 31 and is directed again in the first direction 200 along an outer surface 54 of the outer cylinder 42 to heat the outer surface 54.

The hot air is configured to heat the spindle 31 of each brim former 24A, 24B, 24C, 24D to a temperature that optimizes formation of the rolled brim of the container. In the illustrative embodiment, the hot air is configured to heat the spindle 31 of each brim former 24A, 24B, 24C, 24D to a temperature within a range of about 300 degrees F. to about 500 degrees F. In some embodiments, the hot air may heat the spindle 31 of each brim former 24A, 24B, 24C, 24D to a temperature within a range of about 350 degrees F. to about 400 degrees F. A sensor may be coupled to a non-rotating component near the spindle 31 of one or more brim formers 24A, 24B, 24C, 24D to ensure the temperature of each brim former 24A, 24B, 24C, 24D is adequate for forming the rolled brim on each container. Sensing the temperature of a non-rotating component, such as upstream plates 96A, 96B, 96C, 96D, simplify electrical circuitry of the forming section 20.

The cold-screw section 34 is located downstream of the hot-screw section 32 as shown in FIGS. 6, 7, and 9. The cold-screw section 34 of each brim former 24A, 24B, 24C, 24D engages the rolled brim of the containers moving through it to cause heat to be transferred away from the rolled brim to stiffen the plastics material and fix the shape of the rolled brim. In the illustrative embodiment, the cold water supplied to the cold-screw section 34 is about 60 degrees F. In some embodiments, cooler temperatures may be used.

The cold-screw section 34 includes a mandrel 56 having an interior space 58, a bearing unit 60, and a rotary union 62. The mandrel 56 has an outer surface 64 that shapes the rolled brim of the container as the container is advanced along the cold-screw section 34. The bearing unit 60 is configured to engage the mandrel and stationary components of the brim-forming machine 14 to allow rotation of the mandrel 56 relative to the stationary components. The rotary union 62 is coupled to the stationary components of the brim-forming machine 14 and is formed to include a cold water inlet 66 and a cold-water outlet 68. Cold water is injected into the cold-water inlet 66 from the cold-water supply 28 and is circulated through the interior space 58 before exiting the cold-water outlet 68 to cool the cold-screw section 34 and the containers. The water exiting the cold-water outlet 68 may be recirculated back to the cold-water supply 26 via a return duct 69 for re-cooling and reuse.

The insulation block 36 is located between the hot-screw section 32 and the cold-screw section 34 and limits the flow of heat from the hot-screw section 32 to the cold-screw section 34 as suggested in FIG. 6. The insulation block 36 includes a plurality of insulation panels 36A, 36B, 36C, and 36D as shown in FIGS. 5 and 8. Each insulation panel 36A, 36B, 36C, and 36D corresponds with the spindle 31 of each brim former 24A, 24B, 24C, 24D. Each insulation panel 36A, 36B, 36C, and 36D is formed to include a semi-circular cutout 70 that receives the spindle 31 of each brim former 24A, 24B, 24C, 24D. Each insulation panel 36A, 36B, 36C, and 36D partially overlaps each neighboring insulation panel 36A, 36B, 36C, and 36D to allow bock the hot air from flowing downstream to the cold-screw section 34 even when the spindles 31 are adjusted to accommodate larger containers as discussed below.

Brim-forming machine 14 further includes an alignment system 30 as shown in FIGS. 5 and 10. The alignment system 30 is coupled to the forming section 20 and configured and coordinate adjustment of radial and circumferential alignment of the for brim formers 24A, 24B, 24C, 24D. This adjustment allows for containers of various circumferences to be accommodated on the same machine.

The alignment system 30 includes a set of upstream plates 96A, 96B, 96C, 96D coupled to brim formers 24A, 24B, 24C, 24D at an inlet to the forming section 20 and a set of downstream linear slides 97A, 97B, 97C, 97D coupled to brim formers 24A, 24B, 24C, 24D at an outlet to the forming section 20 as shown in FIG. 2. Plate 96A and linear slide 97A are coupled to brim former 24A. Plate 96B and linear slide 97B are coupled to brim former 24B. Plate 96C and linear slide 97C are coupled to brim former 24C. Plate 96D and linear slide 97D are coupled to brim former 24D. Each plate and linear slide pair is interconnected to one another by an associated longitudinal rail 95A, 95B, 95C, 95D that extends along each associated brim former 24A, 24B, 24C, 24D to cause each brim former to move radially inward and outward independently each other. Each insulation panel 36A, 36B, 36C, and 36D is mounted on an associated longitudinal rail 95A, 95B, 95C, 95D to move therewith. Each servo motor 98 is also coupled to an associated liner slide 97A, 97B, 97C, 97D to move with the each respective brim former 24A, 24B, 24C, 24D.

The alignment system 30 further includes an adjustment plate 99 and a plate driver 100 as shown in FIG. 10. The adjustment plate 99 is configured to rotate about a central axis 99A relative to each brim former 24A, 24B, 24C, 24D in response to actuation of the plate driver 100. Each servo motor 98 is coupled to an associated downstream linear slide 97A, 97B, 97C, 97D to move in response to movement of the adjustment plate 99 by the plate driver 100.

The adjustment plate 99 coordinates both radial and circumferential movement of the servo motors 98 and brim formers 24A, 24B, 24C, 24D. In one example, adjustment plate 99 is formed to include a set of guide slots 110A, 110B, 110C, 110D arranged to extend circumferentially and radially relative to axis 99A and a set of attachment slots 112A, 112B, 112C, 112D arranged to extend only circumferentially relative to axis 99A as shown in FIG. 10. Each attachment slot 112A, 112B, 112C, 112D receives an attachment pin 114A, 114B, 114C, 114D to mount the adjustment plate 99 to stationary components of the brim forming machine 14. Each guide slot 110A, 110B, 110C, 110D receives a guide pin 116A, 116B, 116C, 116D to mount each associated downstream linear slide 97A, 97B, 97C, 97D to the adjustment plate 99. As the plate driver 100 rotates the adjustment plate 99 about axis 99A, the attachment pins and the guide pins included in discharge-end mounts of the servo motors 98 and brim formers 24A, 24B, 24C, 24D are guided by the slots for coordinated movement in the slots as suggested in FIG. 10. Rotation of the adjustment plate 99 in a first direction causes each linear slide 97A, 97B, 97C, 97D and each brim former 24A, 24B, 24C, 24D to move toward the axis 99A. Rotation of the adjustment plate 99 in a second direction opposite the first direction causes the linear slides 97A, 97B, 97C, 97D and each brim former 24A, 24B, 24C, 24D to move away from the axis 99A.

The plate driver 100 includes a lever 118 and a link 120 that extends between and interconnects the lever 118 and the adjustment plate 99 as shown in FIG. 10. The lever 118 is mounted to an exterior portion of the brim forming machine 14, as shown in FIG. 2, so that it is accessible by a user for manual adjustment of the adjustment plate 99. In some embodiments, the lever 118 may be omitted and an automatic actuator may be included for automated adjustment of the adjustment plate 99. The link 120 is mounted to the adjustment plate 99 for pivotable movement about a pinned-end 122 as the lever 118 is actuated to rotate the adjustment plate 99. In the illustrative embodiment, the lever 118 includes a main handle 118A that allows for movement of the adjustment plate 99 at a high rate and a micro-adjustment handle 118B that allows for movement of the adjustment plate 99 at a lower rate.

The servo motors 98 and/or the alignment system 30 may also allow for an auto-home function. The auto-home function controls rotation of each servo motor 98 so that each spindle 31 is at an appropriate angular orientation relative to one another for proper loading of containers between each brim former. In some embodiments, the linear slides 97A, 97B, 97C, 97D may position each brim former 24A, 24B, 24C, 24D at a default positon away from axis 99A that corresponds to containers with a specific diameter. The default position may provide a maximum distance from the axis 99A to allow any sized container to be loaded in the inlet end of the brim forming machine 14. The brim formers 24A, 24B, 24C, 24D may then be adjusted using the plate driver 100 until each brim former 24A, 24B, 24C, 24D is in contact with the brim of the container.

The brim-forming machine 14 creates a rolled brim 16 as shown in FIGS. 1A and 4. A lid 37 mates with the rolled brim 16 and engages the rolled brim in at least several locations 38A, 38B, and 38C as shown in FIG. 4. As a result, sealing between the rolled brim 16 and the lid 37 is maximized while leak paths are minimized.

Rolled brim 16 includes a rolled lip 92 and an annular ridge 19 as shown in FIGS. 1A and 4. Annular ridge 19 is coupled to an inner lip wall 181 of rolled lip 92 and arranged to extend into an exterior ridge-receiving chamber 23 formed between inner lip wall 181 and an exterior surface of a side wall 25 of container 11 as suggested in FIGS. 1A and 4 and away from a distal outer lip wall 182 of rolled lip 92. Distal outer lip wall 182 is arranged to extend inwardly toward side wall 25 at angle so as maximize engagement with lid 37 as shown in FIGS. 1A and 4. During formation of rolled brim 16, rolled lip 92 can be rolled around a pivot provided by annular ridge 19 using the brim-forming machine 14 to produce a rolled brim 16 having a round shape on an exterior surface thereof as shown in FIGS. 1A and 4.

In comparison, a formed brim 90 formed in a different brim-forming machine is shown in FIG. 3. Formed brim 90 includes an annular lip 93 and an annular ridge 94 coupled to an inner lip wall 921 of annular lip 93 as suggested in FIG. 3. Annular ridge 94 is coupled to inner lip wall 921 of annular lip 93 and arranged to extend into an exterior ridge-receiving chamber 923 formed between inner lip wall 921 and an exterior surface of the side wall of a container as suggested in FIG. 3 and away from a distal outer lip wall 922 of annular lip 93. Distal outer lip wall 922 is arranged to extend vertically downwardly away from the side wall causing the lid 37 to minimally engage formed brim 90 as shown in FIG. 3.

Container-manufacturing process 240 includes a series of steps used to make a container 11 having an unrolled brim 5 as shown in FIG. 1. Container-manufacturing process 240 includes, in series, an extrusion step 261, a heating step 262, a molding step 263, a stamping step 264, an accumulating step 265, and a brim-forming step 242 as shown in FIG. 1. Extrusion step 261 extrudes a continuous sheet 270 made of a plastics material. Heating step 262 heats continuous sheet 270. Molding step 263 molds continuous sheet 270 into a continuous molded sheet 280 that includes a set (e.g., array) 281 of containers 11 and a container-carrier sheet 282 coupled to each container 11. Stamping step 264 separates containers 11 from container-carrier sheet 282. Accumulating step 265 accumulates containers 11 to produce several stacks 11S of nested containers 11 as shown in FIG. 1. Each stack 11S of nested containers 11 is then transported to a brim-forming machine 14 wherein the brim-forming step 242 is carried out to convert each container 11 into a drink cup 10 by rolling the unrolled brim 15 as suggested in FIG. 1 to produce the rolled brim 16. Reference is hereby made to U.S. Pat. No. 8,777,046, issued Jul. 15, 2014 and entitled DRINK CUP WITH ROLLED BRIM for disclosure relating container-manufacturing processes and container brims, which patent is hereby incorporated in its entirety.

The following numbered clauses include embodiments that are contemplated and non-limiting:

Clause 1. A brim-forming machine comprising a set of brim formers.

Clause 2. The brim-forming machine of clause 1, any other suitable clause, or any suitable combination of clauses, wherein the set of brim formers is four brim formers.

Clause 3. The brim-forming machine of clause 2, any other suitable clause, or any suitable combination of clauses, wherein each is configured to rotate about a former axis that is spaced from every other former axis.

Clause 4. The brim-forming machine of clause 3, any other suitable clause, or any suitable combination of clauses, further comprising a hot-air manifold coupled to the set of brim formers and configured to provide hot air to the set of brim formers.

Clause 5. The brim-forming machine of clause 4, any other suitable clause, or any suitable combination of clauses, further comprising a cold-water supply coupled to the set of brim formers in longitudinal spaced-apart relation to the hot-air manifold and configured to supply cooling water to the set of brim formers.

Clause 6. The brim-forming machine of clause 5, any other suitable clause, or any suitable combination of clauses, further comprising an alignment system coupled to the set of brim formers and configured to change radial and circumferential positioning of each brim former in the set of brim formers.

Clause 7. The brim-forming machine of clause 6, any other suitable clause, or any suitable combination of clauses, wherein each brim former includes a rotating spindle configured to rotate about the former axis and a servo motor coupled to the rotating spindle to drive rotation of the rotating spindle.

Clause 8. The brim-forming machine of clause 7, any other suitable clause, or any suitable combination of clauses, wherein the rotating spindle includes a hot-screw section which is heated to a hot temperature by the hot air, a cold-screw section which is cooled by the cooling water, and an insulation block located between the hot-screw section and the cold-screw section and configured to minimize the flow of heat from the hot-screw section to the cold-screw section and the hot temperature is greater than the cold temperature.

Clause 9. The brim-forming machine of clause 8, any other suitable clause, or any suitable combination of clauses, wherein the hot-screw section includes an inner cylinder that defines a first hot air passageway and an outer cylinder spaced radially from the inner cylinder such that a second hot air passageway is located between the inner cylinder and the outer cylinder.

Clause 10. The brim-forming machine of clause 9, any other suitable clause, or any suitable combination of clauses, wherein the inner cylinder is formed to include a plurality of longitudinal slots that extend radially through the inner cylinder relative to the former axis to direct hot air from the first hot air passageway to the second hot air passageway.

Clause 11. The brim-forming machine of clause 7, any other suitable clause, or any suitable combination of clauses, wherein the alignment system includes a linear slide coupled to each servo motor and an adjustment plate coupled to each of the linear slides.

Clause 12. The brim-forming machine of clause 11, any other suitable clause, or any suitable combination of clauses, wherein the adjustment plate is formed to include a plurality of slots arranged between an inner annular edge and an outer annular edge, each of the plurality of slots extending only partway circumferentially around the plurality of brim formers and radially outward away from the plurality of brim formers to cause the adjustment plate to move each of the brim formers toward and away from one another upon rotation of the adjustment plate.

Clause 13. A brim-forming machine comprising a plurality of brim formers each configured to rotate about a former axis that is spaced apart from every other former axis.

Clause 14. The brim-forming machine of clause 13, any other suitable clause, or any suitable combination of clauses, wherein each brim former includes a hot-screw section heated by hot air.

Clause 15. The brim-forming machine of clause 14, any other suitable clause, or any suitable combination of clauses, wherein each brim former includes a cold-screw section cooled by chilled water.

Clause 16. The brim-forming machine of clause 15, any other suitable clause, or any suitable combination of clauses, wherein each brim former includes an insulation block located between the hot-screw section and the cold-screw section to block the hot air from flowing from the hot-screw section to the cold-screw section.

Clause 17. The brim-forming machine of clause 16, any other suitable clause, or any suitable combination of clauses, further comprising an alignment system coupled to the plurality of brim formers and configured to change radial and circumferential positioning of each brim former in the set of brim formers.

Clause 18. The brim-forming machine of clause 17, any other suitable clause, or any suitable combination of clauses, wherein the hot section of each of the plurality of brim formers includes an inner cylinder that defines a first hot air passageway and an outer cylinder spaced radially from the inner cylinder such that a second hot air passageway is located between the inner cylinder and the outer cylinder.

Clause 19. The brim-forming machine of clause 18, any other suitable clause, or any suitable combination of clauses, wherein the inner cylinder is formed to include a plurality of longitudinal slots that extend radially through the inner cylinder relative to the former axis to direct hot air from the first hot air passageway to the second hot air passageway.

Clause 20. The brim-forming machine of clause 19, any other suitable clause, or any suitable combination of clauses, wherein the first hot air passageway has an inlet at a first end of the hot-screw section and the second hot air passageway has an outlet at the first end of the hot screw section to release the hot air toward an exterior surface of the outer cylinder.

Clause 21. The brim-forming machine of clause 20, any other suitable clause, or any suitable combination of clauses, wherein the insulation block is located at a second end of the hot-screw section opposite the first end of the hot-screw section.

Clause 22. The brim-forming machine of clause 17, any other suitable clause, or any suitable combination of clauses, wherein the alignment system includes a linear slide coupled to each brim former and an adjustment plate coupled to each of the linear slides.

Clause 23. The brim-forming machine of clause 22, any other suitable clause, or any suitable combination of clauses, wherein the adjustment plate is mounted to a fixed portion of the brim-forming machine for rotation relative to the fixed portion to move simultaneously each brim former radially inward and outward along the linear slides toward and away from one another.

Clause 24. The brim-forming machine of clause 23, any other suitable clause, or any suitable combination of clauses, wherein the adjustment plate is formed to include a plurality of slots arranged between an inner annular edge and an outer annular edge, each of the plurality of slots extending only partway circumferentially around the plurality of brim formers and radially outward away from the plurality of brim formers to cause the adjustment plate to move each of the brim formers toward and away from one another upon rotation of the adjustment plate.

Clause 25. A method of forming a rolled brim on a container, the method comprising providing a plurality of brim formers arranged circumferentially around a central axis.

Clause 26. The method of clause 25, any other suitable clause, or any suitable combination of clauses, further comprising rotating each brim former about an associated former axis that is spaced radially from the central axis.

Clause 27. The method of clause 26, any other suitable clause, or any suitable combination of clauses, further comprising feeding the container between the plurality of brim formers with an unrolled brim of the container in contact with each of the brim formers.

Clause 28. The method of clause 27, any other suitable clause, or any suitable combination of clauses, further comprising advancing the container along each of the brim formers as each brim former is rotated about each former axis.

Clause 29. The method of clause 28, any other suitable clause, or any suitable combination of clauses, further comprising heating a first portion of each brim former with hot air to heat the brim of the container as the container is advanced along each brim former.

Clause 30. The method of clause 29, any other suitable clause, or any suitable combination of clauses, further comprising cooling a second portion of each brim former that is downstream of the first portion to cool the brim of the container.

Clause 31. The method of clause 30, any other suitable clause, or any suitable combination of clauses, further comprising applying pressure on the brim of the container with each of the brim formers as the container is advanced along the first portion and the second portion to provide a rolled brim for the container.

Clause 32. The method of clause 31, any other suitable clause, or any suitable combination of clauses, wherein each brim former is mounted on a linear slide and each linear slide is coupled to an adjustment plate, and the method further includes a step of adjusting a space between each of the brim formers by rotating the adjustment plate about the central axis to move simultaneously each brim former toward or away from the central axis along each linear slide to accommodate different sizes of containers.

Clause 33. The method of clause 31, any other suitable clause, or any suitable combination of clauses, wherein each brim former includes an inner cylinder and an outer cylinder spaced radially from the inner cylinder and the step of heating includes injecting hot air through a first hot-air passageway defined by the inner cylinder in a first direction and through a second hot-air passageway between the inner cylinder and the outer cylinder in a second direction opposite the first direction.

Clause 34. The method of clause 31, any other suitable clause, or any suitable combination of clauses, further comprising the step of insulating between the first portion of each brim former and the second portion of each brim former by blocking the flow of hot air from the first portion to the second portion.

The invention claimed is:

1. A method of forming a rolled brim on a container, the method comprising
    providing a plurality of brim formers arranged circumferentially around a central axis,
    rotating each brim former about an associated former axis that is spaced radially from the central axis,
    feeding the container between the plurality of brim formers with an unrolled brim of the container in contact with each of the brim formers,
    advancing the container along each of the brim formers as each brim former is rotated about each former axis,
    heating a first portion of each brim former with hot air to heat the brim of the container as the container is advanced along each brim former,
    cooling a second portion of each brim former that is downstream of the first portion to cool the brim of the container, and
    applying pressure on the brim of the container with each of the brim formers as the container is advanced along the first portion and the second portion to provide a rolled brim for the container,
    wherein each brim former includes an inner cylinder and an outer cylinder spaced radially from the inner cylinder and the step of heating includes injecting hot air through a first hot-air passageway defined by the inner cylinder in a first direction and through a second hot-air passageway between the inner cylinder and the outer cylinder in a second direction opposite the first direction.

2. The method of claim 1, wherein each brim former is mounted on a linear slide and each linear slide is coupled to an adjustment plate, and the method further includes a step of adjusting a space between each of the brim formers by rotating the adjustment plate about the central axis to move simultaneously each brim former toward or away from the central axis along each linear slide to accommodate different sizes of containers.

3. The method of claim 1, further comprising a step of insulating between the first portion of each brim former and the second portion of each brim former by blocking the flow of hot air from the first portion to the second portion.

4. The method of claim 3, wherein the inner cylinder is formed to include a plurality of longitudinal slots that extend radially through the inner cylinder relative to the former axis to direct hot air from the first hot air passageway to the second hot air passageway.

5. The method of claim 4, wherein the first hot air passageway has an inlet at a first end of the first portion and the second hot air passageway has an outlet at the first end of the first portion to release the hot air toward an exterior surface of the outer cylinder.

6. The method of claim 1, wherein each brim former includes a rotating spindle and a servo motor coupled to the rotating spindle and the method includes rotating each spindle about each respective former axis by each respective servo motor.

7. The method of claim 6, wherein each servo motor is mounted on an adjustment plate and the method further includes rotating the adjustment plate about the central axis and moving each of the servo motors radially inward and outward relative to the central axis.

8. The method of claim 7, wherein the adjustment plate is formed to include a plurality of slots arranged between an inner annular edge and an outer annular edge of the adjustment plate, and each of the plurality of slots extend only partway circumferentially around the central axis and radially outward away from the central axis to cause the adjustment plate to move each of the brim formers and the servo motors toward and away from one another upon rotation of the adjustment plate.

9. A method of forming a rolled brim on a container, the method comprising
providing a plurality of brim formers arranged circumferentially around a central axis,
rotating each brim former about an associated former axis that is spaced radially from the central axis,
feeding the container between the plurality of brim formers with an unrolled brim of the container in contact with each of the brim formers,
advancing the container along each of the brim formers as each brim former is rotated about each former axis,
heating a first portion of each brim former with hot air to heat the brim of the container as the container is advanced along each brim former,
cooling a second portion of each brim former that is downstream of the first portion to cool the brim of the container, and
applying pressure on the brim of the container with each of the brim formers as the container is advanced along the first portion and the second portion to provide a rolled brim for the container,
wherein the hot air is blocked from flowing from the first portion to the second portion by an insulation block including at least one insulating panel arranged to lie between the first portion and the second portion and exterior to the first portion.

10. The method of claim 9, wherein the insulation block includes a plurality of insulating panels and the method further includes sliding the insulating panels relative to one another to accommodate containers of various sizes.

11. The method of claim 10, wherein the first portion and the second portion of each brim former rotate relative to each insulation panel.

12. The method of claim 9, wherein each brim former includes a hot-screw section and a cold-screw section, and the hot-screw section includes an inner cylinder that defines a first hot air passageway and an outer cylinder spaced radially from the inner cylinder to define a second hot air passageway radially between the inner cylinder and the outer cylinder, and wherein the hot air is configured to travel: (i) through the first hot air passageway from an upstream end of the hot-screw section to a downstream end of the hot-screw section, (ii) through the second hot air passageway from the downstream end to the upstream end of the hot-screw section, and (iii) along an outer surface of the hot-screw section from the upstream end to the downstream end.

13. A method of forming a rolled brim on a container, the method comprising
advancing a container along a plurality of brim formers, each brim former including a rotating spindle having a threaded surface that engages a brim of the container to roll the brim of the container as the container is advanced along the plurality of brim formers,
heating a first portion of each brim former with hot air to heat the brim of the container as the container is advanced along the first portion of each brim former,
cooling a second portion of each brim former downstream of the first portion with a cool liquid to cool the brim of the container, and
insulating between the first and second portions by blocking flow of the hot air along the threaded surface from the first portion to the second portion.

14. The method of claim 13, wherein each brim former includes a hot-screw section and a cold-screw section, and the hot-screw section includes an inner cylinder that defines a first hot air passageway and an outer cylinder spaced radially from the inner cylinder to define a second hot air passageway radially between the inner cylinder and the outer cylinder, and wherein the hot air is configured to travel: (i) through the first hot air passageway from an upstream end of the hot-screw section to a downstream end of the hot-screw section, (ii) through the second hot air passageway from the downstream end to the upstream end of the hot-screw section, and (iii) along an outer surface of the hot-screw section from the upstream end to the downstream end.

15. The method of claim 14, wherein the first hot air passageway has an inlet at a first end of the hot-screw section and the second hot air passageway has an outlet at the first end of the hot-screw section to release the hot air toward an exterior surface of the outer cylinder.

16. The method of claim 13, wherein insulating between the first and second portions includes arranging a plurality of insulating panels around the plurality of brim formers and the method further includes sliding the insulating panels relative to one another to accommodate containers of various sizes.

17. The method of claim 13, wherein each brim former further includes a servo motor coupled to each spindle and the method includes rotating each spindle about each respective former axis by each respective servo motor.

18. The method of claim 17, wherein each servo motor is mounted on an adjustment plate and the method further includes rotating the adjustment plate about the central axis and moving each of the servo motors radially inward and outward relative to the central axis.

19. The method of claim 18, wherein the adjustment plate is formed to include a plurality of slots arranged between an inner annular edge and an outer annular edge of the adjustment plate, and each of the plurality of slots extend only partway circumferentially around the central axis and radially outward away from the central axis to cause the adjustment plate to move each of the brim formers and the servo motors toward and away from one another upon rotation of the adjustment plate.

\* \* \* \* \*